Patented June 21, 1927.

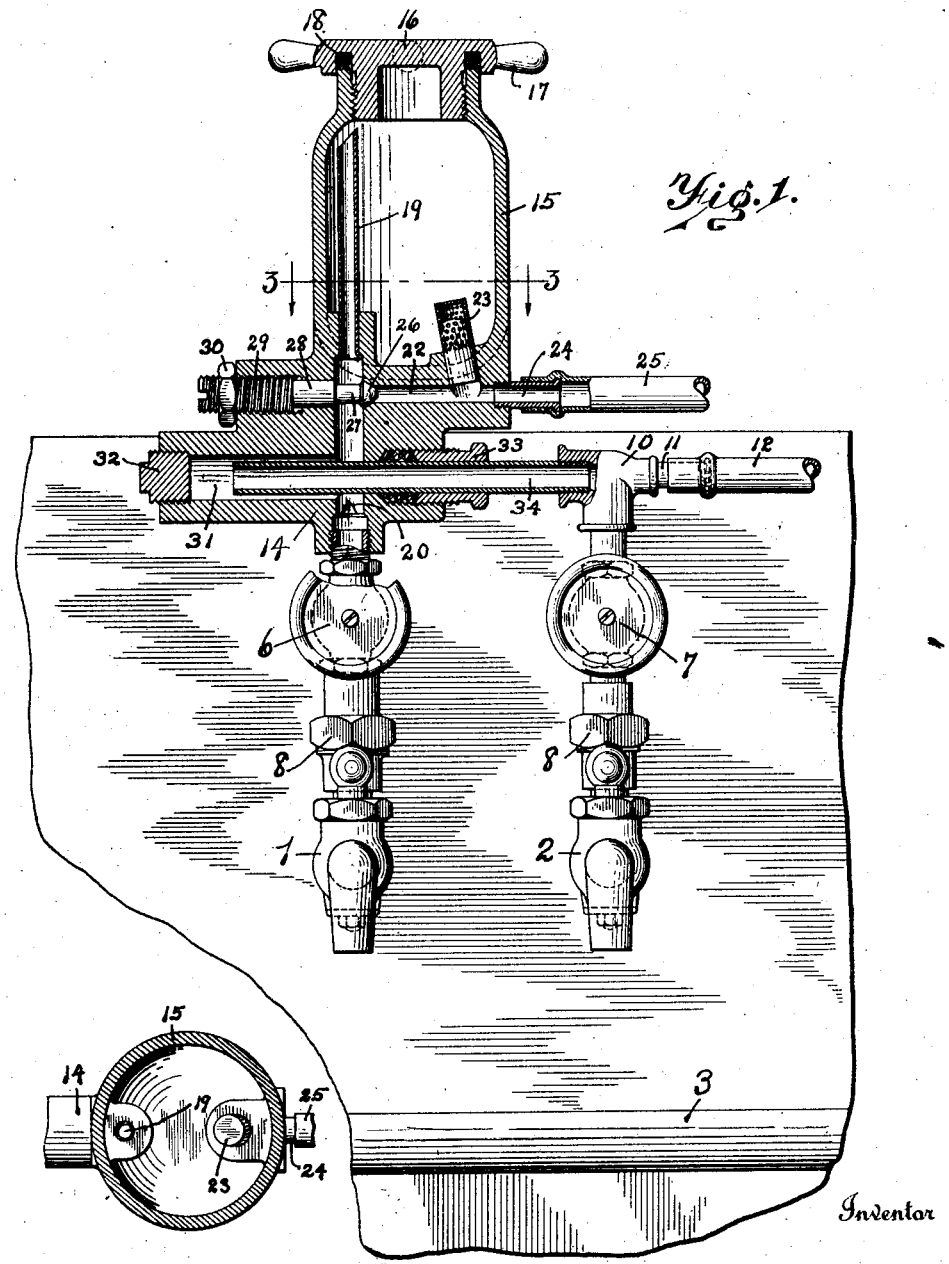

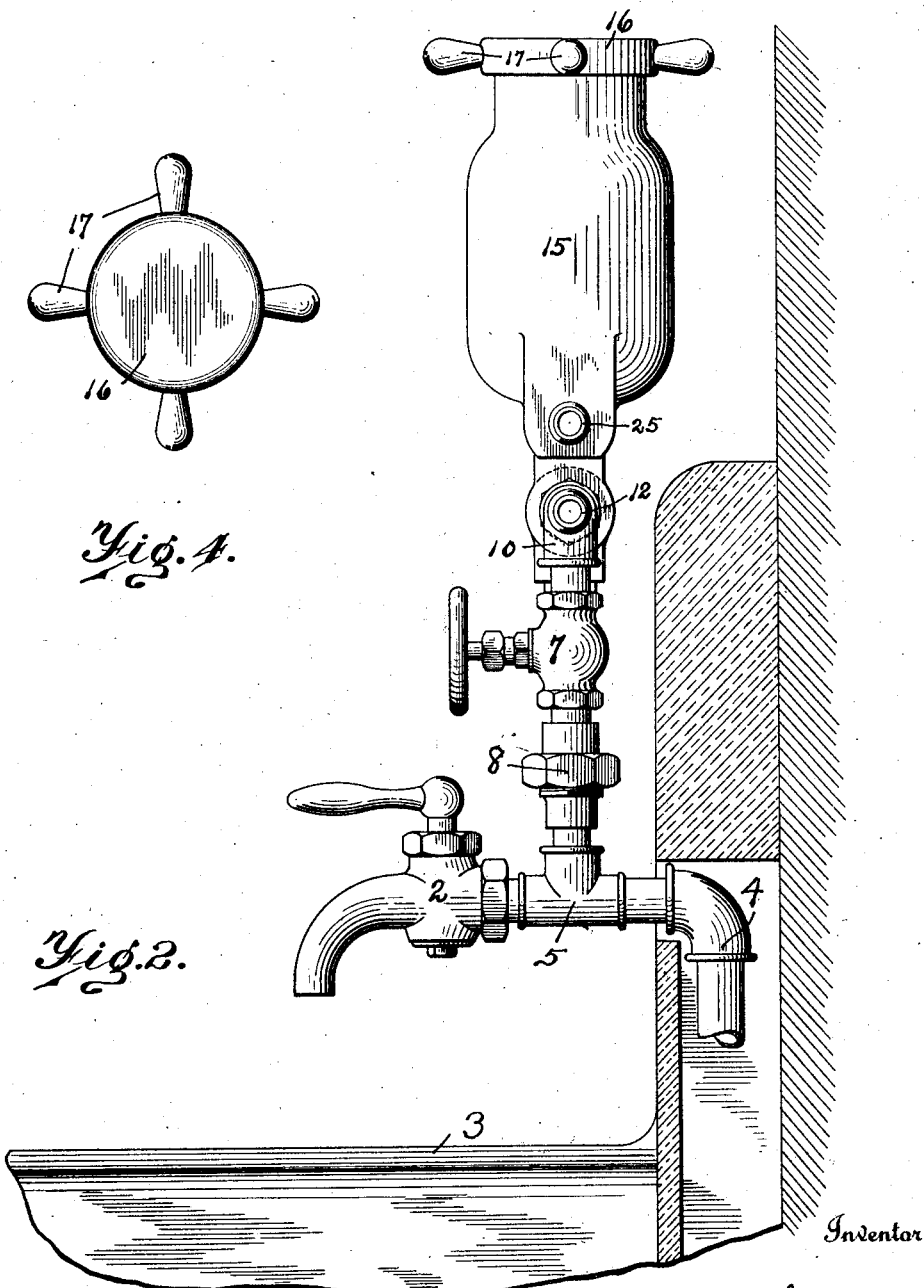

1,632,806

UNITED STATES PATENT OFFICE.

HENRY COLLIER SMITH, OF ST. MARYS, OHIO.

DEVICE FOR SUPPLYING SOAPY WATER.

Application filed May 27, 1922. Serial No. 564,256.

This invention relates to means for supplying cleansing water of any desired temperature, either clear or charged with detergents, to devices such as that shown in my Patent No. 1,563,439, dated December 25, 1925, by means of tubes or pipes, and the object of the invention is to provide a device whereby water may be caused to flow through a container containing soap powder or other cleaning material or is permitted to by-pass this container in the desired proportions.

It further consists in the novel details of construction illustrated in the accompanying drawings and particularly pointed out in the claims.

In the drawings, Fig. 1 is a front elevation of a pair of faucets and this improved supply device in section. Fig. 2 is a side elevation thereof. Fig. 3 is a section on the line 3—3 of Fig. 1. Fig. 4 is a plan of a cap.

Similar reference characters refer to like parts throughout the several views.

Many houses are provided with faucets 1 and 2 over a sink 3 to deliver hot and cold water respectively, pipes 4 being employed to convey the water to these faucets.

In carrying out my invention I prefer to place T's 5 between the faucets and their supply pipes and connect valves 6 and 7 to these T's by means of unions 8. The valve 7 connects to the T 10, to which a nipple 11 connects the discharge tube 12, which is preferably of rubber.

The valve 6 preferably connects directly to the body 14 of this supply device, the upper end 15 of which is a container for the soap powder and is closed by a screw plug 16. Handles 17 are shown by which this plug may be turned but they may be omitted if desired, but the packing ring 18 fitted in a groove in this plug is desirable.

A supply nozzle 19 extends up from the passage 20, into the lower end of which the valve 6 connects, and this valve controls the maximum flow of hot water to this passage. The valve body is formed with a transverse auxiliary passage 22 into which the short perforated tube 23 connects, the end of this tube being preferably closed to prevent too rapid flow of dissolved soap. A nipple 24 connects the tube 25 to this passage. The connection between this auxiliary passage 22 and the upright passage 20 is controlled by a valve 26 whose stem is reduced at 27 so as not to obstruct the passage 20, is enlarged at 28 to closely fit the bore in the valve body and prevent leakage, is threaded at 29 in the valve body to permit adjustment of the valve, and has a jam nut 30 on its outer end to lock the valve stem from turning and also prevent leakage.

The valve body is also formed with a second transverse passage 31, closed at one end by the plug 32 and into whose other end the gland 33 of a stuffing box is threaded. A pipe 34 screws into the T 10 and is slidable into this passage to permit this improved supply device to be attached to faucets which are spaced different distances apart. This pipe 34 permits the passage of clear hot water to the tube 12. It also permits the flow of the desired amount of cold water to the mixing chamber.

The operation of this device is as follows. The valve 6 is adjusted for maximum flow of hot water and the valve 7 to determine the temperature of this hot water. The valve 26 is adjusted to determine the proportion of hot water passing into the container 15 and passing directly through the auxiliary passage 22 to the tube 25. When the container has been filled with cleansing powder, hot water will pass through it and the tube 23 to the tube 25. Other hot water will pass directly through the auxiliary passage 22 to the tube 25, the amount depending on the valve 26, the two streams mixing. Clear hot water will pass from the passage 20 to the open end of the pipe 34 and through that to the tube 12. No soap is consumed unless water flows through the tube 25.

The details and proportions of this device may all be changed without departing from the spirit of my invention as set forth in the following claims.

I claim:—

1. In a device of the character described, the combination of a body, a container connected thereto and having a filling opening, a water inlet and an outlet, said body having a supply passage leading to the water inlet of the container and an auxiliary discharge passage extending from the supply passage and connecting to the container outlet, means to conduct water to said supply passage, a flexible tube connected to the discharge passage to carry water therefrom, said body having a second discharge passage connecting to the supply passage, a flexible tube connected to the second discharge passage to carry water therefrom, and means to supply additional water to the second discharge passage.

2. In a device of the character described, a container for soap powder having inlet and outlet passages, a passage connecting them outside of said container, and a passage connecting said inlet passage to a source of hot water; a valve in said last named passage, a tube connecting to said passage connecting to the source of hot water, a pipe connecting to said tube and to a source of cold water, valves to regulate the proportional flow of hot and cold water, and flexible discharge tubes connecting to said transverse passage and to said tube.

3. In a device of the character described, a container for soap powder and a body whereon the container is mounted, said body being formed with passages constituting inlet and outlet passages for said container, a transverse passage connecting them, and a passage connecting the inlet passage to a source of hot water; a valve in said last named passage to control the flow of water to said container, a tube slidably mounted in said body and connecting to the hot water passage, a pipe connecting said tube to a source of cold water, valves to regulate the proportional flow of hot and cold water, and flexible discharge tubes connecting to said transverse passage and to said source of cold water.

H. COLLIER SMITH.